July 16, 1963  D. D. BOYD  3,097,841
COIL EXPANDER
Filed June 24, 1960
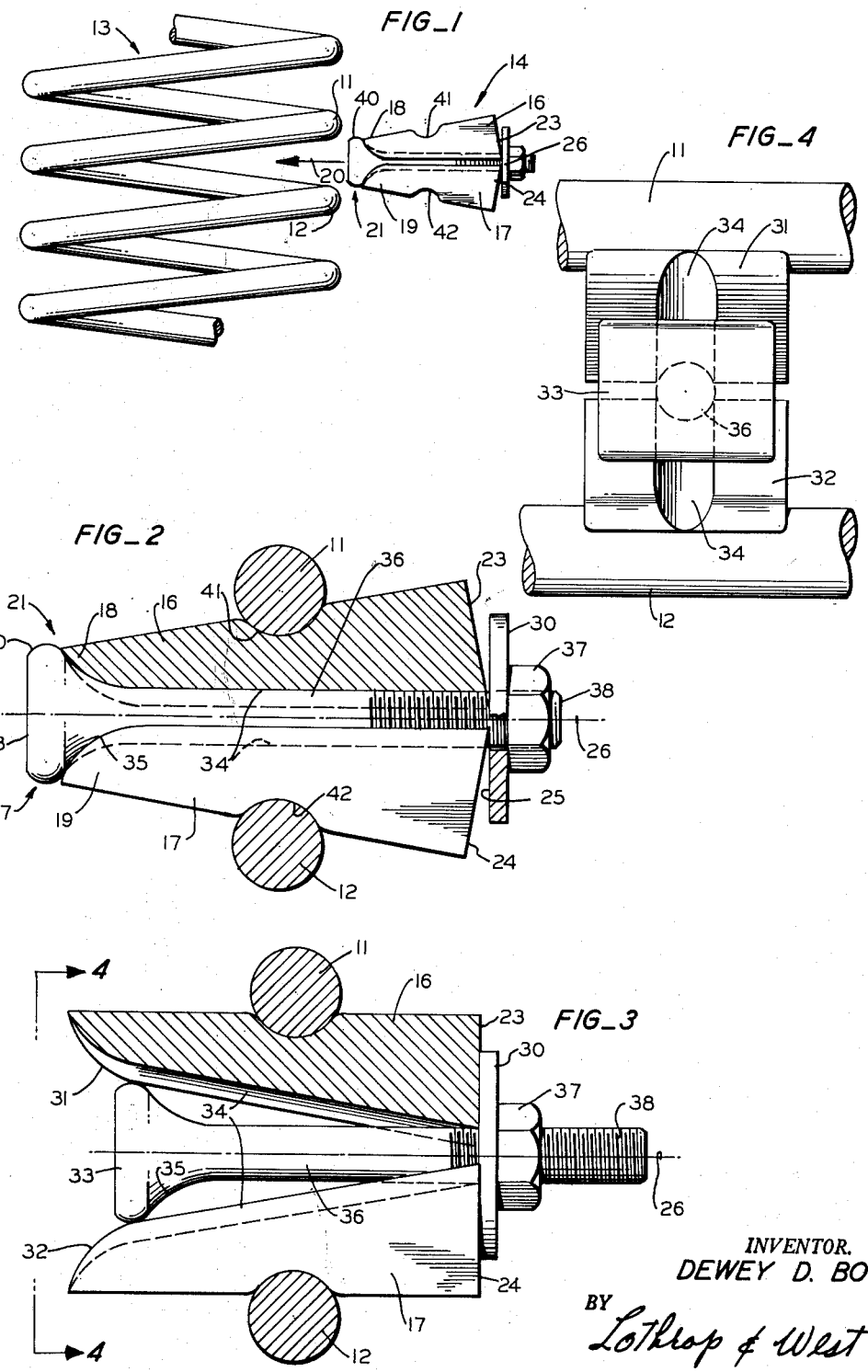
INVENTOR.
DEWEY D. BOYD
BY Lothrop & West
ATTORNEYS

United States Patent Office 3,097,841
Patented July 16, 1963

3,097,841
COIL EXPANDER
Dewey D. Boyd, 3702 Lenore Way,
North Highlands, Calif.
Filed June 24, 1960, Ser. No. 38,616
2 Claims. (Cl. 267—60)

This invention relates to apparatus for adjusting coils and, more particularly, to apparatus for spreading and holding apart the adjacent portions of a helical or coil spring.

Previously in the art of adjusting and increasing the compression resistance of a coil spring, especially in automobile suspensions, it has been customary first to expand adjacent turns of the coil by means of a tool, and then to insert various forms of shims or spacers therebetween. Sometimes, wedges have been inserted as spacers so as to avoid having to use expansion tools, but wedges of the types used have often had a tendency to slip out because of the necessary inclination of the wedge faces.

It is therefore an object of the present invention to provide a coil expander particularly for automobile springs and the like, adapted for simple and foolproof installation on a coil, and for secure retention thereon even under conditions of rough use and abuse, and formed of rugged parts for a long and useful life.

It is another object of the invention to provide a coil expander adapted for installation to a precisely adjusted degree of expansion of the coil and providing facility for subsequent readjustment to correspond with changing degrees of compression resistance of the coil under use and wear, the installation, adjustment and readjustment of the coil expander of the invention being made with the aid of only simple, standard and widely obtainable tools and requiring but little skill or physical strength in the manipulation thereof during the installation and adjusting process.

It is still another object of this invention to provide a coil expander adapted for quick and easy installation and for subsequent adjustment to provide a high degree of retention on the coil.

It is a further object of this invention to provide a generally improved coil expander.

Other objects, together with the foregoing, are attained in the embodiment described in the following description and shown in the accompanying drawings in which:

FIGURE 1 is a side elevational view of a coil expander constructed in accordance with the present invention, preparatory to being applied to a typical coil;

FIGURE 2 is an enlarged side elevational view, partly in section, of the coil expander in an applied position on the coil, preparatory to being expanded;

FIGURE 3 is a further view similar to that of FIGURE 2 and showing the coil expander in another applied position, namely, in expanded position; and FIGURE 4 is an end elevational view, taken generally in the direction of lines 4—4 of FIGURE 3.

While the coil expander of the invention is susceptible of numerous physical embodiments, depending on the environment and requirements of use, substantial numbers of the herein shown and described embodiment have been made, used and tested, and all have performed in a highly successful fashion.

For expanding adjacent turns 11 and 12 of a helical or coil spring 13, the device of the invention provides a wedge member, generally indicated by the reference numeral 14. As here shown, the member 14 includes a pair of acutely inclined wedge elements 16 and 17, formed as wedges of triangular cross section (FIGURES 1–3). The apex ends 18 and 19 of the wedge elements converge toward the apex end 21 of the wedge member 14 and are substantially contiguous to one another in the unexpanded condition of the member. Thus, in contracted position, the wedge member 14 can be inserted and wedged between the turns 11 and 12, in the direction indicated by the arrow 20 in FIGURE 1.

The wedge elements 16 and 17 are substantially engaged with each other, particularly at the adjacent portions of the base ends 23 and 24 thereof, for pivoting movement with respect to each other (as shown in FIGURES 2 and 3) about an axis perpendicular to the longitudinal axis 26 of the wedge member 14. The bases 23 and 24 are remote from the apices 18 and 19, respectively, of the member, and as here shown the adjacent portion of the bases 23 and 24 bears against and is supported by the bearing surface 25 of a washer 30.

Also provided is a means, here shown as including a spreading element or bolt 27, in engagement with the other elements of the wedge member 14, for expanding the member as by causing relative outward pivoting movement of the wedges 16 and 17. Particularly, the wedges 16 and 17 have opposed facing interior camming surfaces 31 and 32 arcuately diverging toward the apex end 21 of the member 14. The enlarged head portion 33 and the arcuate transition portion, or neck 35, of the bolt 27 fits between the cam surfaces 31 and 32, the bolt being selectively movable toward the base ends 23 and 24 of the wedges so as to urge the wedges apart and thus to effect the desired spreading action thereof.

The interior camming surfaces of the wedges are relieved over their central portions to form a pair of opposed central longitudinal channels 34 to receive the shank 36 of the bolt which extends longitudinally between the wedges and outwardly beyond the base ends 23 and 24 thereof.

A nut 37 is threaded onto the extended end 38 of the shank, and bears against the base ends 23 and 24 of the wedges, so that when the nut is tightened on the bolt, the bolt head 33 is drawn into the zone between the wedges and by the camming effect exerted on the surfaces of the wedges causes their lateral expansion. The washer 30 is here shown as interposed between the nut 37 and the wedges to distribute the bearing forces and more effectively to indicate when the wedges have reached their optimum expansion position, the bases 23 and 24 being then in full engagement with the washer 30, as appears in FIGURE 3.

As here shown also, the head 33 has a substantially greater dimension parallel to the cam surfaces 31 and 32 than transverse thereto (see FIGURE 4), so that when the nut 37 is tightened on the bolt, the bolt is secured against relative rotation with respect to the wedges.

For providing a more solid gripping engagement with the coil turns 11 and 12, the wedge member 14 is formed with a pair of opposite transverse grooves 41 and 42 on the outer faces thereof and conforming to the shape of the turns 11 and 12. When the wedge is in contracted or closed condition, as in FIGURE 1, and is urged inwardly bettween the turns 11 and 12, the bevelled portion 40 of the head 33 serves to spread the spring enough to permit entry. Further inward movement serves to spread turns 11 and 12 still more. Then, when the wedge member is driven in far enough so that the turns 11 and 12 drop into the grooves 41 and 42 the operator knows that the expander is at the proper location and that spreading of the wedges can be undertaken. The grooves also serve to prevent dislodgement of the expanded wedges.

It will be seen that the device of the invention is well adapted for use with ordinary tools, such as a wrench, and requiring neither the skill nor the physical strength that would be demanded of an operator for spreading the turns 11 and 12 as by means of a tire iron or bar. The device is easily inserted as a wedge and is easily adjusted and expanded and, when once expanded, the device presents substantially parallel faces to the coil turns as shown in FIGURE 3 to prevent reverse slipping of the device from between the turns, the grooves 41 and 42 further resisting dislodgement.

It can therefore be seen that I have provided a relatively simple yet rugged and highly effective coil expander which can be easily installed by any person with only the simplest kind of hand tools.

What is claimed is:

1. A coil expander comprising:
 (a) a pair of opposed elongated wedge elements each substantially traingular in longitudinal section including an apex and a base, and substantially rectangular in transverse section, each of said wedge elements including a planar outer surface extending from the outer edge of said base to said apex and interrupted by a transverse groove, each of said wedge elements further including an inner camming surface having an arcuate portion adjacent said apex and a planar portion merging smoothly with said arcuate portion and extending to the inner edge of said base, said inner camming surface being interrupted by a central longitudinal groove;
 (b) a bolt including a generally rectangularly shaped head having one pair of camming sides parallel to and in engagement with said inner camming surfaces of said wedge elements, said bolt further including an arcuate neck portion shaped to conform with said arcuate portions of said inner camming surfaces of said wedge elements, and a stem extending longitudinally between said wedge elements in registry with said central longitudinal grooves, said stem having a threaded portion projecting beyond said bases of said wedge elements, said wedge elements being disposed on opposite sides of said bolt with one pair of said sides of said bolt head and said outer surfaces of said wedge elements together forming in closed position of said wedge elements a susbtantially continuous, uninterrupted wedge-shaped member beginning at said head and extending along said outer surfaces to said transverse grooves; and
 (c) a nut engaged on said threaded portion of said nut and bearing against said bases of said wedge elements for translating said bolt and said head toward said bases and for thereby camming apart said wedge elements about said bases as fulcrums.

2. The device of claim 1 wherein said bases in said closed position of said wedge elements are inclined from said inner edges of said bases in contact with said nut in a direction away from the plane of the adjacent face of said nut, each of said bases being substantially perpendicular to the corresponding one of said outer surfaces, said pair of outer surfaces being in parallel relation as said wedge elements are cammed apart to a position wherein said bases are in full face to face engagement with the adjacent face of said nut.

References Cited in the file of this patent

UNITED STATES PATENTS

| 356,564 | Watson et al. | Jan. 25, 1887 |
| 1,349,437 | Roger | Aug. 10, 1920 |
| 2,914,330 | Wheeler | Nov. 24, 1959 |

FOREIGN PATENTS

| 496,346 | France | Aug. 1, 1919 |